United States Patent
Willinger

[15] 3,687,291
[45] Aug. 29, 1972

[54] VALVELESS PUMP FOR AN AQUARIUM

[72] Inventor: Allan H. Willinger, New Rochelle, N.Y.

[73] Assignee: Metaframe Corporation, Maywood, N.J.

[22] Filed: Aug. 19, 1970

[21] Appl. No.: 64,991

Related U.S. Application Data

[63] Continuation-in-part of Ser. No. 754,249, Aug. 21, 1968, Pat. No. 3,554,375.

[52] U.S. Cl. ................................................210/169
[51] Int. Cl. .............................................E04h 3/20
[58] Field of Search....................................210/169

[56] References Cited

UNITED STATES PATENTS

| | | |
|---|---|---|
| 3,554,375 | 1/1971 | Willinger...................210/169 |
| 2,748,075 | 5/1956 | Houlid.......................210/169 |
| 2,275,428 | 3/1942 | Haldeman..................210/169 |
| 2,672,845 | 3/1954 | Schnerthorst..........210/169 X |

*Primary Examiner*—Reuben Friedman
*Assistant Examiner*—T. A. Granger
*Attorney*—Friedman & Goodman

[57] ABSTRACT

A valveless pump for an aquarium having a portion suitably disposed with respect to the aquarium tank for drawing the aquarium water into the pump. The pump includes a reciprocating piston which issues a jet of aquarium water from the pump into a tube for flow back to the body of aquarium water within the tank. The pump cooperates with a filtering device for clearing the aquarium water, wherein the aquarium water may pass through the filtering device before or after the pumping action. Preferably, the pump portion extends through a wall of the aquarium tank.

18 Claims, 5 Drawing Figures

INVENTOR.
Allan H. Willinger
BY Friedman & Goodman
ATTORNEYS

INVENTOR.
Allan H. Willinger 3,687,291

VALVELESS PUMP FOR AN AQUARIUM

CROSS-REFERENCE TO RELATED APPLICATION

This application is a continuation-in-part of application, Ser. No. 754,249, filed Aug. 21, 1968 now U.S. Pat. No. 3,554,375.

BACKGROUND OF THE INVENTION

As generally understood, the proper maintenance of an aquarium requires continuous water filtration. In accordance with present practice, a typical filtering device may include a separate filtering tank continuously receiving water for filtration through a siphon connected to it from the aquarium tank, a conventional air lift tube or centrifugal pump, and an outlet connected from the pump to the aquarium tank for returning filtered water to the latter. In devices using an air lift tube, it is usual to provide an air pump having inlet and outlet valves to achieve controlled fluid flow. With a centrifugal pump, the pressure gradient is relied on to achieve proper fluid directional flow. The above-mentioned application, No. 754,429, now U.S. Pat. No. 3,554,375 discloses a valveless pump disposed in a separate filtering tank mounted on the aquarium tank, whereby the aquarium water must be siphoned into the filtering tank before being pumped back to the aquarium tank. In the present invention there is no need for a siphon, whereas even the separate filtering tank may be eliminated.

SUMMARY OF THE INVENTION

This invention relates to a pump, and more particularly to a valveless pump for an aquarium which cooperates with a filtering device for clearing the aquarium water. The pump includes a reciprocating piston which issues a jet of water from the pump for circulation of the aquarium water between the aquarium tank and the filtering device. The pump is directly associated with an aquarium tank to provide an optimum, efficiently operating arrangement which enables the elimination of the siphon and the conventional filtering tank, wherein the pump forms a part of the aquarium tank.

Accordingly, an object of the present invention is to provide an improved pump associated with an aquarium which overcomes the disadvantages of the prior art.

Another object of this invention is to provide a valveless pump applied to an aquarium tank which provides for an optimum, efficiently operating arrangement.

A still further object of this invention is to provide a pump which is extremely simple and includes few parts which can get out of order through operation or continued use, whereby the pumps can be readily produced and maintained with relatively little expense, which nevertheless is highly efficient in operation and has a relatively long trouble-free life.

An added object of this invention is to provide a pump which forms a part of the aquarium tank thereby eliminating the conventional filtering tank which normally houses the pump.

BRIEF DESCRIPTION OF THE DRAWINGS

Having in mind the above and other objects that will be evident from an understanding of this disclosure, the invention comprises the devices, combinations and arrangements of parts as illustrated in the presently preferred embodiments of the invention which is hereinafter set forth in such detail as to enable those skilled in the art readily to understand the function, operation, construction and advantages of it, when read in conjunction with the accompanying drawings in which.

DESCRIPTION OF THE PREFERRED EMBODIMENTS

Figure 1:
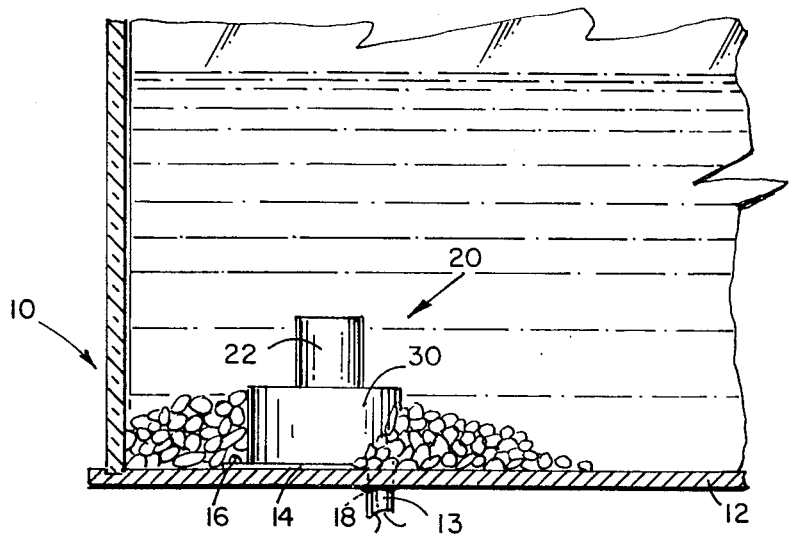
FIG. 1 represents a fragmentary, front elevational view, in section, of an aquarium tank provided with a pump pursuant to the present invention.

Referring to the drawings, FIG. 1 illustrates an aquarium tank 10 provided with a valveless pump 20 of the present invention. The pump 20 includes a piston housing 22 and an annular housing 30, as will be discussed hereinbelow. In this embodiment, the pump 20 is disposed within the tank 10, being secured to the bottom wall 12 of the tank 10. The annular housing 30 is provided with a laterally extending annular flange 14 having apertures therein. The flange 14 is secured to the bottom wall 12 by conventional screw means 16 which are received in the flange apertures and threaded into the bottom wall 12. The bottom wall 12 is provided with an opening 18 to receive therethrough the electrical power cord 13 of the pump 20, the cord 13 being connectionable to an electrical power source (not shown).

Figure 2:
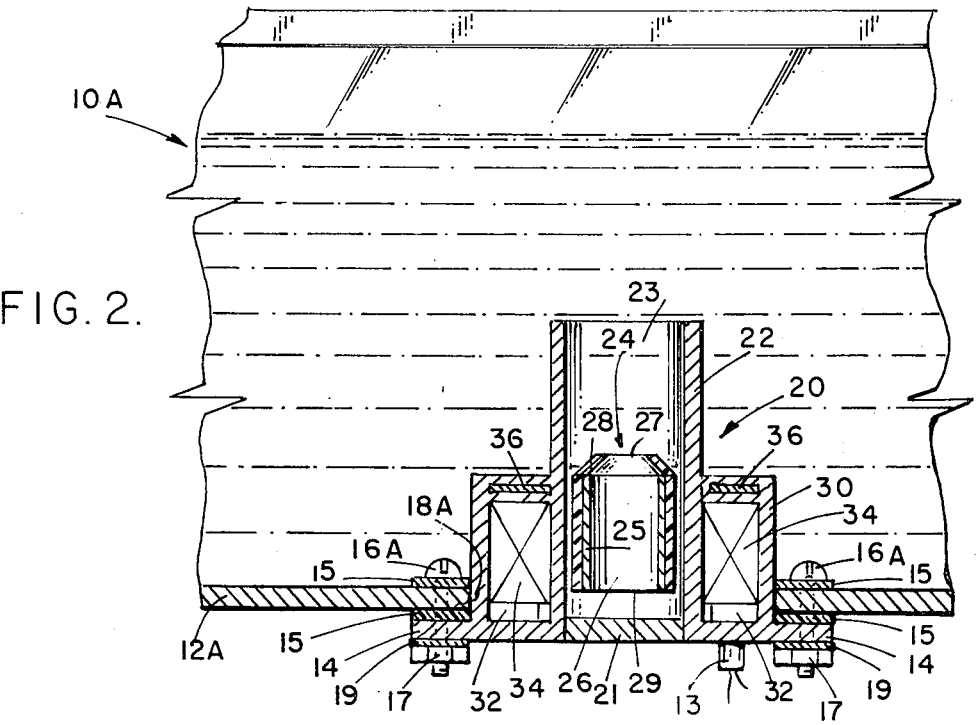
FIG. 2 represents a fragmentary, front elevational view, in section, of a second embodiment of the present invention, showing a major portion of the pump extending through the bottom portion of the aquarium tank on which the pump is mounted.

FIG. 2 illustrates a second embodiment of the invention, showing an aquarium tank 10A provided with the pump 20. The piston housing 22 and the annular housing 30 are formed from a non-magnetically attracted material preferably plastic. The piston housing 22 is closed at one end by a member 21 which is secured thereto by conventional means, to seal the bottom portion thereof. The piston housing 22 is provided with an opening 23 which defines both an intake opening and a discharge opening, the function of which will be set forth hereinbelow.

The piston housing 22 receives a piston 24. The piston 24, when not per se fabricated of a magnetically attracted material, includes a sleeve 25 fabricated of such material appropriately secured, as by friction fit, within the piston 24. The piston housing 22 and the piston 24 are preferably of a cylindrical configuration, with the piston 24 having a smaller diameter so that the internal surface of the housing 22 is slightly spaced from the outer surface of the piston 24 to effectively confine the piston 24 to a prescribed path during the reciprocating movements thereof.

The piston 24 is provided with an axial bore 26 terminating in a small diameter opening 27 in the conically shaped end portion 28. The other end portion of the piston 24 is opened at 29, the function of these openings 27, 29 will be discussed hereinbelow.

A bottom portion of the cylindrical wall of the piston housing 22 forms an inner wall of the annular housing 30 which is preferably formed integrally with the piston housing 22. The annular housing 30 defines a waterproof, sealed compartment 32 for a conventional magnetic field producing coil, diagrammatically illustrated and designated 34 in the drawings. A permanent ferrite magnet 36 is spaced from the coil 34. A pole piece (not shown) is strategically located between the lower end portion of the coil 34 and the inner wall of the annular housing 30. The coil 34 is electrically connected to the power cord 13. A more detailed description of the contents of the annular housing 30, including the coil 34, magnet 36 and pole piece, is set forth in the above-mentioned application, No. 754,429, to which reference may be made, wherein the function thereof will be discussed hereinbelow.

The bottom wall 12A of the aquarium tank 10A is provided with an opening 18A as large as the diameter of the annular housing 30 to receive therethrough the pump 20, wherein the annular flange 14, which extends laterally from the annular housing 30, has a larger diameter than the opening 18A so that the flange 14 is disposed outside the tank 10A to position the pump 20 within the tank 10A. The flange 14 and the bottom wall 12A are provided with aligned apertures to receive conventional screw means 16A which coact with conventional nut means 17 to secure the flange 14 to the bottom wall 12A. Preferably, conventional sealing rings 15, which are also provided with aligned apertures to receive the screw-means 16A, are disposed on the annular housing 30, being positioned between the heads of the screw means 16A and the bottom wall 12A, and between the bottom wall 12A and the flange 14 to seal the interior of the aquarium tank 10A. Also, conventional bearing washers 19 are disposed on the screw means 16A between the flange 14 and the nut means 17.

Figure 3:
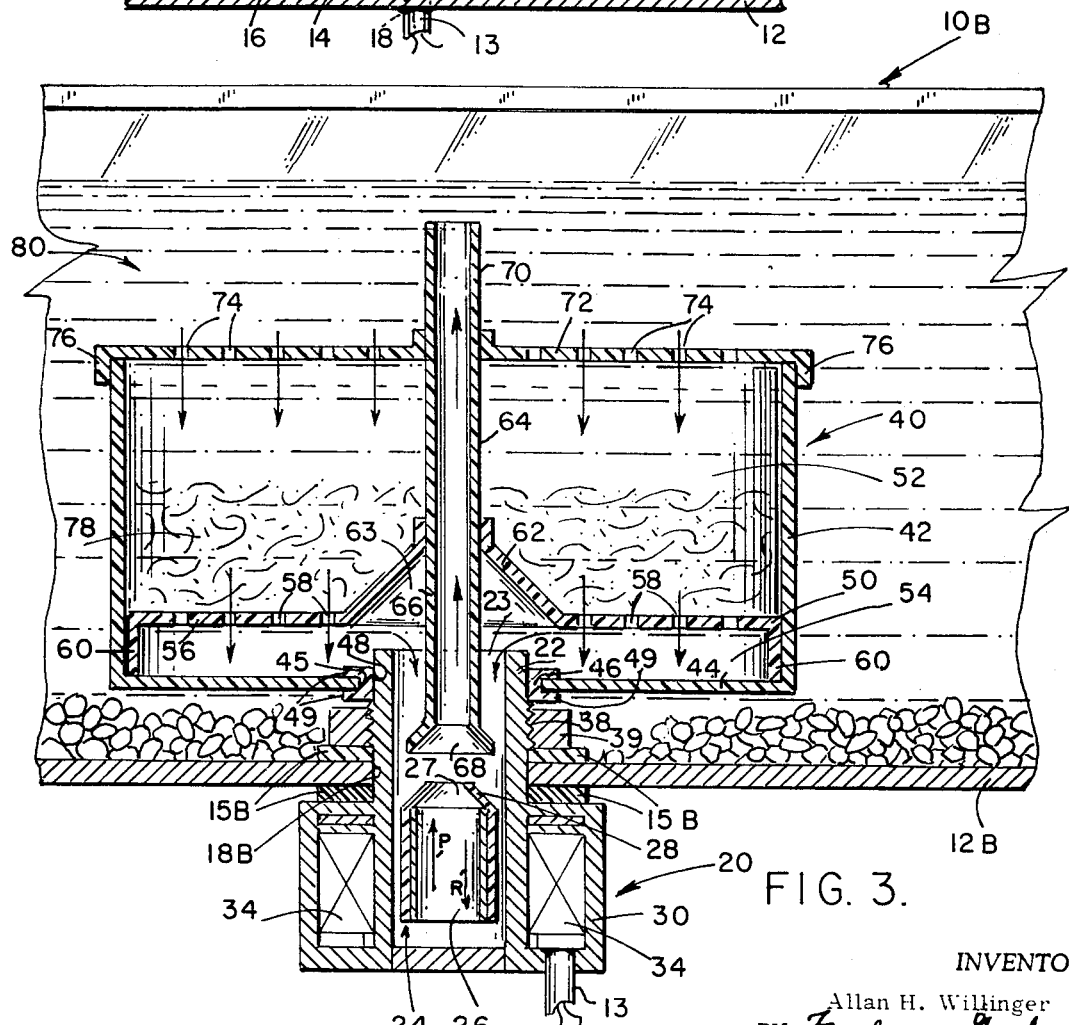
FIG. 3 represents a fragmentary, front elevational view, in section, of a third embodiment of the present invention, showing the pump cooperating with a filtering device within the aquarium tank.

FIG. 3 illustrates a third embodiment of the invention, showing an aquarium tank 10B provided with the pump 20 and a filtering device 40. In this embodiment, the bottom wall 12B of the aquarium tank 10B is provided with an opening 18B as large as the diameter of the piston housing 22 to receive the pump 20, wherein the annular housing 30 has a larger diameter than the opening 18B so that the annular housing 30 is disposed outside the tank 10B.

A portion of the piston housing 22 is externally threaded at 38 to receive an internally threaded member 39 to secure the pump 20 to the bottom wall 12B. Preferably, conventional sealing rings 15B disposed on the piston housing 22, being positioned between the threaded member 39 and the bottom wall 12B, and between the bottom wall 12B and the annular housing 30 to seal the interior of the aquarium tank 10B.

The filtering device 40 includes a receptacle 42 having a bottom wall 44 provided with an opening 45 therein to receive the upper portion of the piston housing 22. An annular member 46 provided with an opening 48 is disposed within the opening 45. The annular member 46 is also provided with laterally extending flanges 49 which define a groove therebetween to receive the bottom wall 44 therein to secure the annular member 46 to the bottom wall 44. The opening 48 is substantially equal to the diameter of the piston housing 22, whereby the annular member 46 is mounted on the piston housing 22, preferably press fitted, to secure the receptacle 42 to the pump 20 to thereby position the filtering device 40 within the aquarium tank 10B.

A platform 50 is disposed within the receptacle 40. The platform 50 includes a horizontal wall 56 provided with a plurality of perforations or slots 58, and wall means 60 extending downwardly from the wall 56 and resting on the bottom wall 44 to space the wall 56 from the bottom wall 44. The wall 56 extends across the interior of the receptacle 42, from sidewall-to-sidewall, to define an upper compartment 52 and a lower compartment 54. The wall 56 is also provided with an upwardly extending conical section 62, centrally located thereon. The conical section 62 is provided with an opening to receive a tube 64 therein, the conical section opening being substantially in axial alignment with the opening 23 in the piston housing 22.

The tube 64 is secured by conventional means to the conical section 62, preferably by being press fitted. The tube 64 has one end 66 extending downwardly into the piston housing, the end 66 being provided with an opening 68. The opening 68 has a mouth larger than the opening 27 of the piston 24. The other end 70 extends upwardly and out of the receptacle 50. The tube 64 is substantially in axial alignment with the piston housing 22 and therefore, with the piston 24.

The receptacle 42 is provided with a cover 72 on the upper portion thereof. The cover 72 is provided with a plurality of perforations or slots 74, and wall means 76 extending downwardly therefrom to secure the cover 72 to the receptacle 42. The cover 72 is also provided with a centrally located opening to receive and position the tube 64 therein, the tube 64 being secured by conventional means to the cover 72, preferably by being press fitted.

A layer of filtering material 78, which may be selected from a wide range of materials having water-filtering properties, is disposed within the compartment 52 of the receptacle 42, the filtering material 78 resting on the platform 50.

When the aquarium tank 10B is filled with water 80, the water 80 will flow through the perforations 74 in the cover 72 into the compartment 52 of the receptacle 42. The water 80 also will flow through the filtering material 78 where it cleared, and through the perforations 58 in the platform 50 into the compartment 54. The water 80 will then fill the chamber 63 defined by the conical section 62, and flow around the tube 64 into the opening 23 of the piston housing 22, and fill the interior of the piston housing 22 including the bore 26 of the piston 24. The end 70 of the tube 64 may either be above or below the water surface. If the end 70 is above the water surface, then only that portion of the tube 64 below the water surface will be filled with water, as water seeks its own level. If the end 70 is below the water surface, then the entire tube 64 will be filled with water.

As generally understood, and in accordance with the operation contemplated by the present invention, coil 34 is electrically energized so as to produce magnetic fields of alternating polarity which has the operative effect of producing, in a well understood manner, vertically reciprocating movements in the piston 24. That is, piston 24 submerged in the water 80 within its housing 22, occupies a starting clearance position relative to the opening 68, and upon operation of the coil 34, the piston 24 is actuated through an upward stroke P to an adjacent position in closer proximity to the opening 68. At the end of the upward stroke P of the piston 24, at which time the piston 24 is slightly spaced from the tube 64, the reversal of polarity of the field produced by the coil 34 occurs and is effective of producing movement of the piston 24 through a downward stroke R to its initial starting clearance position.

The mode of operation of the pump 20 may be explained as follows: During the movement of the piston 24 through the upward stroke P towards the adjacent opening 68, the volume of water between the piston 24 and the tube 64 is displaced and flows partly into the opening 68 and partly through the small opening 27 in the piston end portion 28 into the larger bore 26 to fill the space below in the piston housing 22 vacated by the piston 24. When the piston 24 is reversed and moves through the downward stroke R, the volume of water within the bore 26 and within the space below the piston 24 is displaced, and because the opening 27 is smaller than the bore 26, a jet of water issues out of the small opening 27. This jet of water is directed into the mouth of the adjacent opening 68 of the tube 64, which is substantially in axial alignment with the opening 68 as stated above, causing a corresponding displacement of a volume of water within the tube 64.

The momentum imparted to the volume of water on the downward stroke R of the piston 24 causes the volume of water to continue up the tube 64. The acceleration of the volume of water tends to be reduced due to the gravity acting on the water column of the tube 64. The next upward stroke P of the piston 20a displaces an additional volume of water which tends to slow down the return of the volume of water within the tube 64 to its original position.

However, the volume of water is again caused to move up the tube 64 by the next jet of water issued on the following downward stroke R of the piston 24, which occurs before the volume of water has time to flow back down the tube 64 to its original position. This pump action occurs over and over again, so that a succession of jets of water enables the piston 24 to pump the volume of water up the tube 24, ultimately causing water to continuously exit from the opening in the end 70 of the tube 64 for flow into the water body 80 of the aquarium tank 10B.

The above pumping action causes the water 80 to be drawn into the piston housing 22 from the chamber 63 of the compartment 54, this water 80 having been cleared by the filtering material 78 in the compartment 52. As the water 80 is being drawn into the pump, more cleared water is caused to pass from compartment 52 to compartment 54 through the perforations 58. This above action causes the water 80 to flow through the perforations 74 in the cover 72 into the compartment 52 of the receptacle 42 for filtration. As shown, the water 80 is circulated by flowing from the aquarium tank 10B into the filtering device, passing through the filtering device 40, and then being pumped back into the body of water in the aquarium tank 10B.

The force fit, securing the tube 64 to the conical section 62 and the cover 72, does not preclude making adjustment movements in the tube 64 through a range of positions of movement closer or further away from the piston 24. When tube 64 is projected closer to piston 24, the volume of water 80 displaced through it during successive strokes of the piston 24 is at a maximum, and of course the reverse is true as the distance separating the opening 68 and the piston 24 is increased. This provides selective control over the volume or rate of water being pumped, and therefore over the volume being filtered by the filtering device 40, permitting the hobbyist to adapt the flow of water to suppress noise, minimize disturbance to the environment and achieve other benefits.

Figure 4:
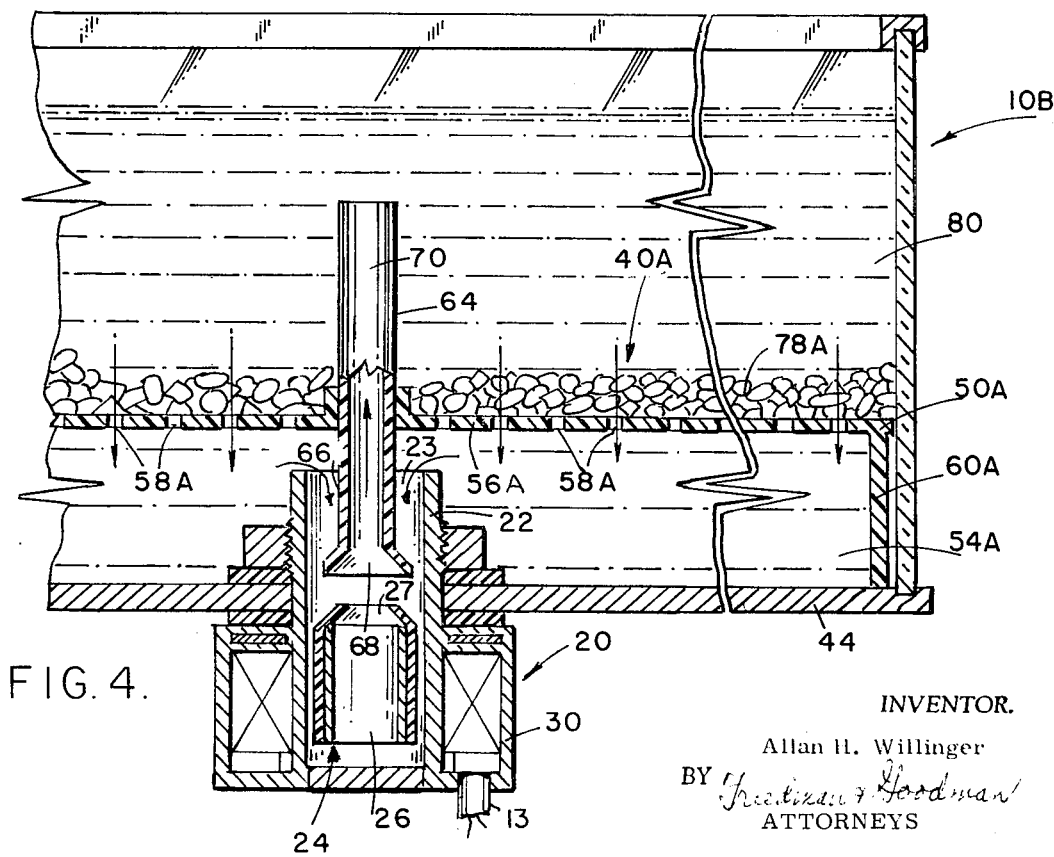
FIG. 4 represents a fragmentary, front elevational view, in section, of a fourth embodiment of the present invention, showing the pump cooperating with a modified filtering device within the aquarium tank.

Reference is now made to a fourth embodiment of this invention, as illustrated in FIG. 4. In this embodiment the aquarium tank 10B, the pump 20 and the tube 64 of FIG. 3 are shown with a different filtering device 40A.

The filtering device 40A includes a horizontal partition 50A having a horizontal wall 56A provided with a plurality of perforations or slots 58A, and support means 60A extending downwardly from the partition wall 56A and resting on the bottom wall 44 of the aquarium tank 10B to space the partition wall 56A from the bottom wall 44. The partition 50A may either extend completely across the interior of the aquarium tank 10B, from sidewall-to-sidewall, or across a portion thereof. The partition 50A defines a lower compartment 54A, where in the latter case, the support means 60A cooperate with the partition wall 56A to define the compartment 54A.

The piston housing of the pump 20 is disposed in the compartment 54A. The partition 50A is also provided with an opening to receive the tube 64 therein, the partition opening being substantially in axial alignment with the opening 23 in the piston housing 22. A layer of conventional filtering material 78A is disposed on the upper surface of the partition wall 56A, with the end 70 of the tube 64 extending above the upper surface of the partition wall 56A.

The pumping action of the pump 20 is the same as set forth hereinabove; however as the water 80 is being drawn in the pump 20, the water 80 is caused to pass from the aquarium tank 10B to the compartment 54A through the perforations 58A. This action causes the water 80 to flow through the filtering material 78A for filtration. As shown, the water 80 is circulated by flowing through the filtering device 40A into the piston housing 22 of the pump 20, and then being pumped back through the tube 64 into the body of water in the aquarium tank 10B.

Figure 5:
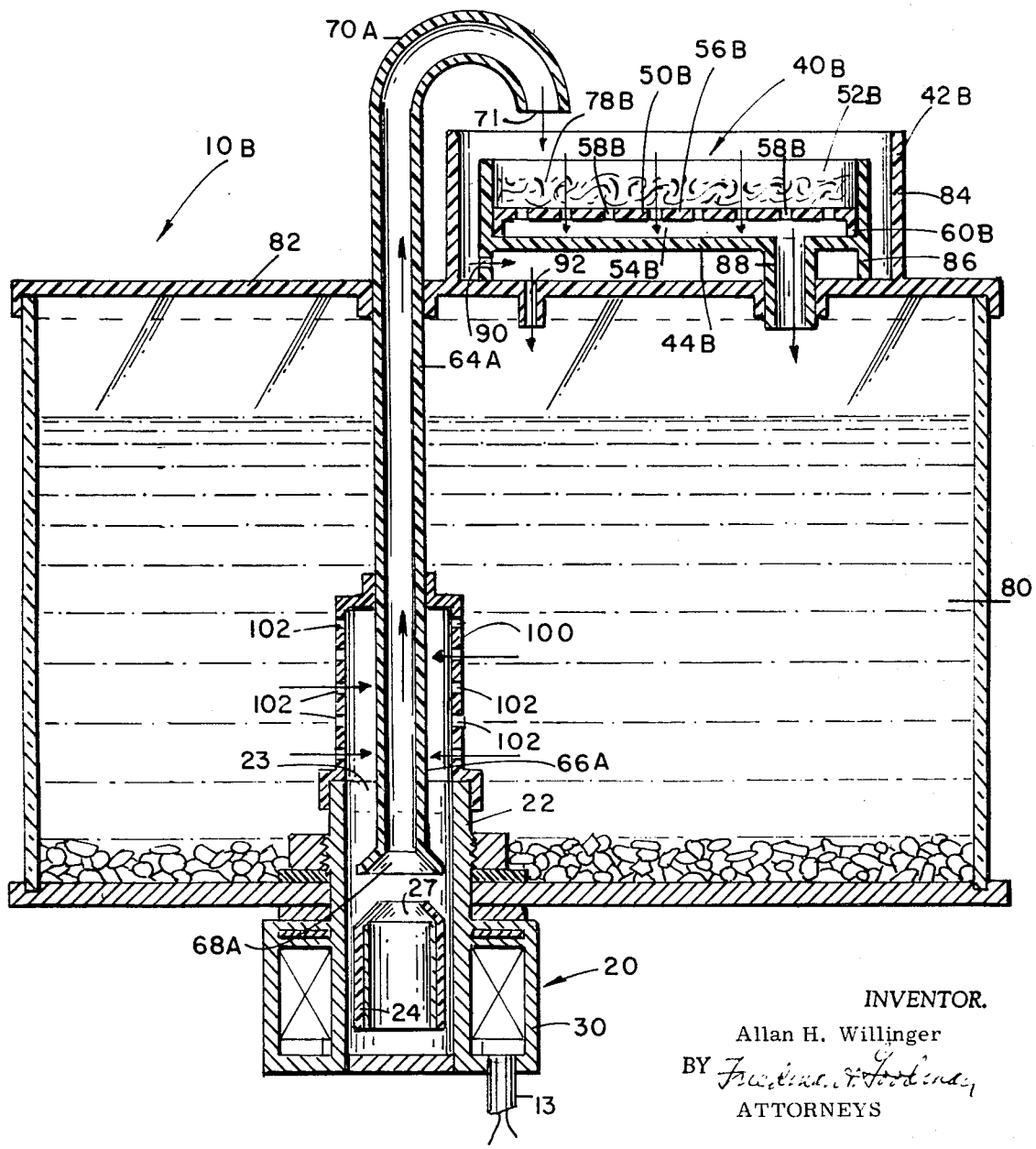
FIG. 5 represents a front elevational view, in section, of a fifth embodiment of the present invention, showing the pump cooperating with a filtering device externally mounted above the aquarium tank.

Reference is now made to a fifth embodiment of this invention, as illustrated in FIG. 5. In this embodiment the aquarium tank 10B and the pump 20 of FIGS. 3 and 4 are shown with a modified tube 64A and a different filtering device 40B.

The aquarium tank 10B is provided with a cover 82 having a receptacle 84 disposed thereon. The filtering device 40B is disposed within the receptacle 84.

The filtering device 40B includes a receptacle 42B provided with support means 86 to position the receptacle 42B on the upper surface of the cover 82 and also provided with conduit means 88 which extends downwardly through an opening in the cover 82 so that there is flow communication between the interior of the receptacle 42B and the interior of the aquarium tank 10B. The support means 86 are provided with openings 90 which cooperate with an opening 92 in the cover 82 so that there is flow communication between the interior of the cover receptacle 84 and the interior of the aquarium tank 10B, the function of which will be set forth hereinbelow.

A platform 50B is disposed within the filter device receptacle 42B. The platform 50B includes a horizontal wall 56B provided with a plurality of perforations or slots 58B, and wall means 60B extending downwardly from the wall 56B and resting on the bottom wall 44B of the receptacle 42B to space the wall 56B from the wall 44B. The wall 56B extends across the interior of the receptacle 42B, from sidewall-to-sidewall, to define an upper compartment 52B and a lower compartment 54B. A layer of conventional filtering material 78B is disposed within the compartment 52B, the filtering material resting on the platform 50B.

A housing 100 is secured to the upper portion of the piston housing 22, preferably by friction fit. The housing 100 is provided with a plurality of small perforations 102 which allow the water to flow into the housing 100 but prevent the passage of fish or other aquarium inhabitants therein. The upper portion of the housing 100 is provided with an opening to receive the tube 64A therein, the housing opening being substantially in axial alignment with the opening 23 in the piston housing 22.

The tube 64A is secured to the housing 100, preferably by friction fit, so that the end 66A of the tube extends downwardly into the piston housing 22, the end 66A being provided with an opening 68A having a mouth larger than the opening 27 of the piston 24. The other end 70A extends upwardly through an opening in the cover 82 and is hook-shaped to be in a position over the filtering device 40B so that any water discharged from the opening 71 will flow downwardly into the compartment 52B of the filter device receptacle 42B. The tube 64A may also be secured to the cover 82, preferably by friction fit.

The pumping action of the pump 20 is the same as set forth hereinabove; however, as the water 80 is being drawn into the pump 20, the water 80 is caused to pass from the aquarium tank 10B to the interior of the housing 100 through perforations 102. The water 80 is pumped up the tube 64A and then discharged into the filtering device 40B. The water 80 passes through the filtering material 78B to clear the water 80, and then flows by way of gravity through the perforations 58B into the compartment 54B. From the compartment 54B, the water 80 flows again by way of gravity through the conduit means 88 back into the body of water in the aquarium tank 10B. As shown, the water 80 is circulated by flowing through the housing 100 into the piston housing 22 of the pump 20, and then being pumped into the filtering device 40B from which the water 80 passes back into the aquarium tank 10B.

If the water 80 should overflow the filtering device 40B and flow from the compartment 52B into the cover receptacle 84, the overflow water would pass through the openings 90 in the support means 86. Then, the overflow water would flow by way of gravity through the opening 92 in the cover 82 back into the aquarium tank 10B.

It is noted that each of the filtering devices 40, 40A, and 40B shown in FIGS. 3, 4 and 5, respectively, may be used with the pump arrangement shown in either FIG. 1 or FIG. 2.

Numerous alterations of the structure herein disclosed will suggest themselves to those skilled in the art. However, it is to be understood that the present disclosure relates to a preferred embodiment of my invention which is for purposes of illustration only and not to be construed as a limitation of the invention.

What is claimed is:

1. A valveless pump in combination with an aquarium tank provided with a front wall, a rear wall, opposing side walls and a bottom wall to contain a volume of water therein, said aquarium tank being provided with a filtering device cooperating with said pump for clearing the water in said aquarium tank, said pump being disposed adjacent one of said walls of said aquarium tank with a portion of said pump extending through an opening provided in said one wall, means positioning said pump adjacent to said one wall, said pump comprising a piston housing provided with a piston therein, a tube disposed in said aquarium tank, said tube being provided with an inlet opening in alignment with said piston and an outlet opening constructed and arranged to be in fluid communication with said filtering device, and means for moving said piston through strokes between a position removed from said inlet opening of said tube and an alternate position in closer proximity thereto such that during each of said strokes away from said alternate position an amount of water within said piston housing is forced into said tube, whereby said amount of water by displacement causes a fluid flow through the filtering device to clear the water.

2. A valveless pump in combination with an aquarium tank according to claim 1, wherein said piston housing is disposed within said aquarium tank, said positioning means securing said pump to said aquarium tank one wall.

3. A valveless pump in combination with an aquarium tank according to claim 2, wherein said aquarium tank one wall is said bottom wall of said aquarium tank.

4. A valveless pump in combination with an aquarium tank according to claim 3, wherein said positioning securing means includes a laterally extending annular flange disposed on said pump, said flange being secured to an inner surface of said bottom wall disposed within said aquarium tank, said opening in said bottom wall receiving therethrough an electrical power cord of said pump for connection to an electrical power source to provide said means for moving said piston.

5. A valveless pump in combination with an aquarium tank according to claim 3, wherein said positioning securing means includes a laterally extending annular flange disposed on a bottom portion of said pump, said opening in said bottom wall receiving therethrough said bottom portion of said pump with said flange being secured to an outer surface of said bottom wall disposed outside said aquarium tank.

6. A valveless pump in combination with an aquarium tank according to claim 3, wherein said means for moving said piston are disposed in a waterproof housing, said waterproof housing being disposed around a lower portion of said piston housing, said opening in said bottom wall receiving therethrough said piston housing wherein said opening is smaller than said waterproof housing so that said waterproof housing is adjacent an outer surface of said bottom wall disposed outside said aquarium tank, said positioning securing means being disposed on said piston housing within said aquarium tank so that said bottom wall is disposed between said positioning securing means and said waterproof housing, thereby securing said pump to said bottom wall.

7. A valveless pump in combination with an aquarium tank according to claim 6, wherein said piston housing is externally threaded, said positioning securing means including an internally threaded member which is threaded onto said piston housing to secure said pump to said bottom wall.

8. A valveless pump in combination with an aquarium tank according to claim 1, wherein said filtering device for clearing the water is disposed within said aquarium tank, said tube outlet opening being disposed above said filtering device.

9. A valveless pump in combination with an aquarium tank according to claim 8, wherein said filtering device includes a horizontally disposed platform defining an upper and lower compartment, said platform being provided with a plurality of perforations to allow the water to flow there-through, wherein cleared water flows through said perforations into said lower compartment, said piston housing receiving the cleared water from said lower compartment wherein said piston forces the cleared water into said tube, so that said outlet opening of said tube discharges the cleared water into said aquarium tank.

10. A valveless pump in combination with an aquarium tank according to claim 9, wherein said platform is provided with an aperture to receive therethrough said tube.

11. A valveless pump in combination with an aquarium tank according to claim 1, wherein said filtering device for clearing the water is disposed outside said aquarium tank, said tube extending outside said aquarium tank, said tube outlet opening being disposed above said filtering device for discharging the water into said filtering device.

12. A valveless pump in combination with an aquarium tank according to claim 11, wherein said filtering device includes a horizontally disposed platform defining an upper and lower compartment, said platform being provided with a plurality of perforations to allow the water to flow therethrough, wherein said tube discharges uncleared water into said upper compartment and cleared water flows through said perforations into said lower compartment, said filtering device being provided with means to discharge the cleared water from said lower compartment into said aquarium tank.

13. A valveless pump in combination with an aquarium tank according to claim 12, wherein said filtering device is disposed above said aquarium tank, said means to discharge the cleared water into said aquarium tank using gravity to cause the cleared water to flow into said aquarium tank.

14. A valveless pump in combination with an aquarium tank according to claim 11, wherein a housing connects said tube to said piston housing, said connecting housing being provided with a plurality of small perforations to allow water to flow into said connecting housing from where the water flows into said piston housing, but prevents passage of aquarium inhabitants therein.

15. An aquarium device according to claim 1, wherein one opening of said pump defines both an intake opening and a discharge opening, said one opening of said pump being disposed within said aquarium tank.

16. An aquarium device according to claim 1, wherein said filtering device is disposed within said aquarium tank.

17. An aquarium device according to claim 1, wherein said one wall is said bottom wall of said aquarium tank.

18. An aquarium device according to claim 1, wherein one opening of said pump defines both an intake opening and a discharge opening, said one opening of said pump being disposed within said aquarium tank for coacting with said filtering device which is also disposed within said aquarium tank, said one wall being said bottom wall of said aquarium tank.

* * * * *